US008650239B2

(12) United States Patent
Moharil et al.

(10) Patent No.: US 8,650,239 B2
(45) Date of Patent: Feb. 11, 2014

(54) HARDWARE IMPLEMENTATION OF A GALOIS FIELD MULTIPLIER

(75) Inventors: Shriram D. Moharil, Allen, TX (US); Rejitha Nair, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 518 days.

(21) Appl. No.: 12/875,732

(22) Filed: Sep. 3, 2010

(65) Prior Publication Data

US 2011/0060782 A1 Mar. 10, 2011

Related U.S. Application Data

(60) Provisional application No. 61/240,391, filed on Sep. 8, 2009.

(51) Int. Cl.
*G06F 7/72* (2006.01)
(52) U.S. Cl.
USPC .......................................... 708/492
(58) Field of Classification Search
None
See application file for complete search history.

(56) References Cited

U.S. PATENT DOCUMENTS

| 4,797,848 | A * | 1/1989 | Walby .................. 708/492 |
| 5,768,168 | A * | 6/1998 | Im .................... 708/492 |
| 7,177,891 | B2 | 2/2007 | Stein et al. |
| 7,403,964 | B2 | 7/2008 | Porten et al. |
| 7,483,935 | B2 | 1/2009 | Hansen et al. |
| 7,526,518 | B2 | 4/2009 | Zhang et al. |
| 7,599,981 | B2 | 10/2009 | Ekner et al. |
| 7,607,068 | B2 | 10/2009 | Gopal et al. |
| 7,668,895 | B2 | 2/2010 | Lin et al. |
| 7,761,776 | B1 | 7/2010 | Bataineh |
| 2010/0306293 | A1* | 12/2010 | Li et al. ................. 708/209 |
| 2011/0060782 | A1* | 3/2011 | Moharil et al. ........... 708/230 |

\* cited by examiner

*Primary Examiner* — David H Malzahn
(74) *Attorney, Agent, or Firm* — John R. Pessetto; Wade J. Brady, III; Frederick J. Telecky, Jr.

(57) ABSTRACT

An embodiment of the invention provides a method of operating a Galois field multiplier in a processor. An n bit multiplier and an n bit multiplicand are received during a first group of one or more clock cycles. An (2n−1) bit product is calculated based on the n bit multiplicand and the n bit multiplier. The (2n−1) bit product is stored in a first memory element during the first group of one or more clock cycles. An n bit polynomial value is received during a second group of one or more clock cycles. During the second group of one or more clock cycles, the (2n−1) bit product is divided by the n bit polynomial value producing an n bit result. The n bit result is stored in a second memory element during the second group of one or more clock cycles.

12 Claims, 9 Drawing Sheets

1

HARDWARE IMPLEMENTATION OF A GALOIS FIELD MULTIPLIER

BACKGROUND

The speed at which many processors operate is often measured in cycles per second or at a clock frequency f. The period T of the clock is the reciprocal 1/f of the frequency. The frequency f of a processor is usually limited by the longest delay path (often called a critical path) between one memory element (e.g. a register) and another memory element. A delay path, for example, includes the time it takes for data to leave a first memory element, propagate through a logic block, and be stored in a second memory. A logic block may perform various operations. For example a logic block may perform operations such as adding numbers, comparing numbers or multiplying numbers.

The clock frequency f may be increased using several techniques. For example, the clock frequency f may be increased by making transistors that are used in memory elements and logic blocks switch faster. These transistors may be made to switch faster by making them smaller in selected dimensions (e.g. gate length of a MOSFET (metal oxide semiconductor field-effect transistor)). Reducing the size of transistors also allows more circuits to be included on a chip. Including more circuits on a chip may make the chips less costly.

Another technique that may be used to increase clock frequency f is to reduce the number of logic elements (e.g. NANDs, NORs, multiplexers etc.) in a delay path required to perform a function. Various techniques may be used to reduce the number of logic elements in a delay path used to perform a function. For example, a Karnaugh map may be used to reduce the number of logic elements needed to perform a function.

Some functions, for example multiplication and division, may require more than one clock cycle to be fully executed. The number of clock cycles required to perform a function may also be reduced by reducing the longest delay path from one memory element, through a logic block, and into a second memory block. Reducing the longest delay path may allow more calculations to done in a single clock cycle and as a result may reduce the number of clock cycles needed to perform a function such as multiplication.

DETAILED DESCRIPTION

The drawings and description, in general, disclose a method and apparatus for operating a Galois field multiplier in a processor. In one embodiment, a $(2n-1)$ bit product is calculated based on an n bit multiplier operand and an n bit multiplicand. The $(2n-1)$ bit product is calculated in one or more clock cycles and then stored in a first memory element. After the $(2n-1)$ bit product is stored in a first memory element, the $(2n-1)$ product is divided by an n bit polynomial value in one or more clock cycles. After the $(2n-1)$ product is divided by the n bit polynomial value, the n bit result of the division is stored in a second memory.

In one embodiment of the invention, the $(2n-1)$ product is calculated by first producing partial products from the n bit multiplier operand and the n bit multiplicand operand. Next the partial products are logarithmically reduced by XOR gates to produce the $(2n-1)$ product.

A branch in mathematics known as Galois field (GF) theory deals mainly with the analysis and formal description of binary operations upon polynomials. The binary extensions of Galois fields ($GF(2^N)$) are used extensively in digital logic circuitry. Addition and multiplication are common Galois operations. Multiplication in a finite field, such as a Galois field, is multiplication modulo a polynomial value used to define the finite field (i.e., it is multiplication followed by division using the polynomial value as the divisor). Operations upon elements in Galois fields are accomplished via bitwise operations such as XOR, AND, and OR operations. A bitwise operation operates on one or more bit patterns or binary numerals at the level of their individual bits. "ANDing", XORing", "ORing" etc. refers to performing bitwise logical operations such as AND, XOR or OR logical operations on bit patterns.

Galois field multipliers have been used both for coding theory and for cryptography. Both areas are complex, with similar needs, and both deal with fixed symbolic alphabets that neatly fit the extended Galois field model.

Figure 1:
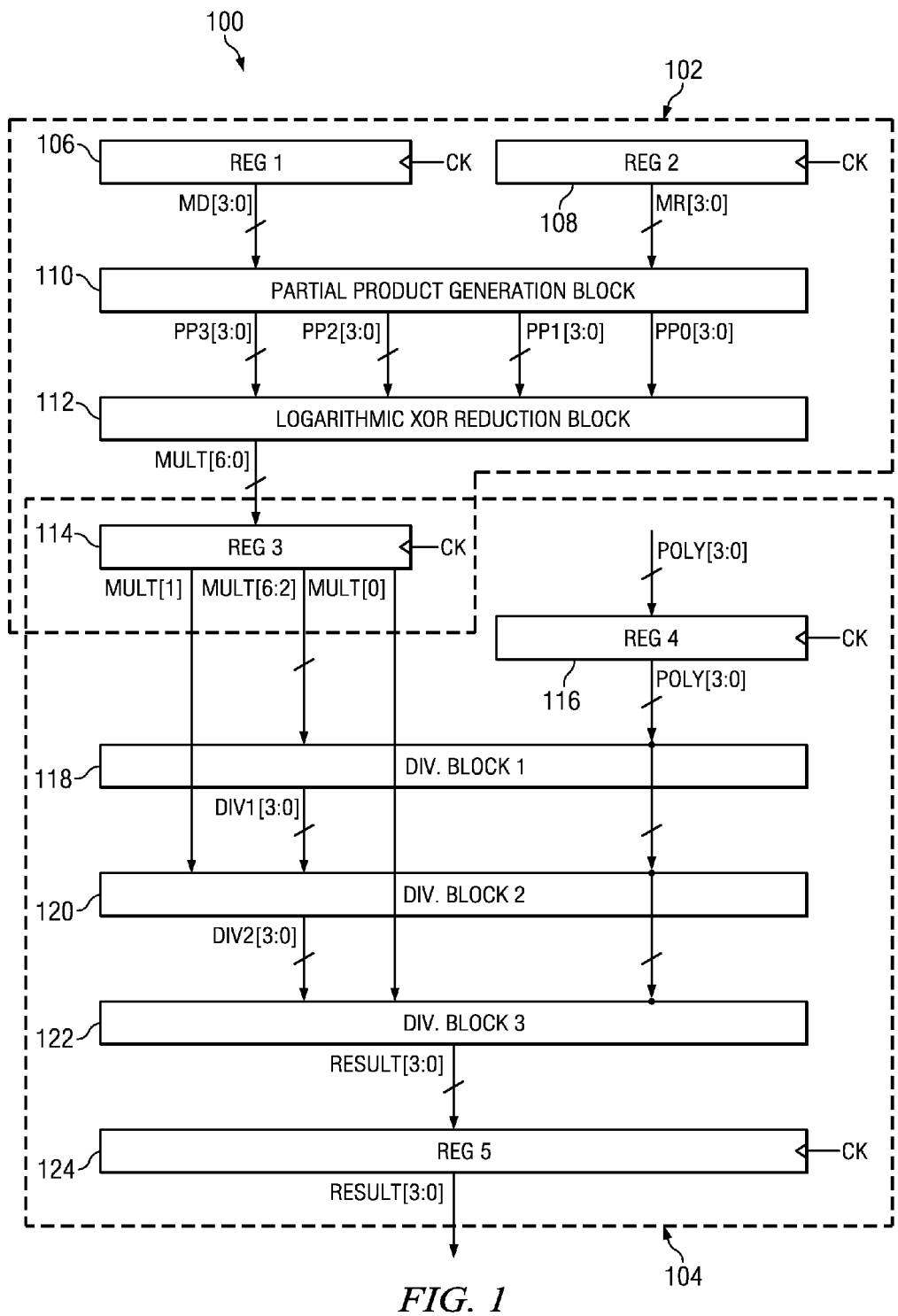
FIG. 1 is a block diagram of an embodiment of a Galois field multiplier having a 4 bit multiplier operand, a 4 bit multiplicand operand and a 4 bit polynomial value.

FIG. 1 is a block diagram of an embodiment of a Galois field multiplier 100 having a 4 bit multiplier operand MR[3:0], a 4 bit multiplicand operand MD[3:0] and a 4 bit polynomial value POLY[3:0]. In this embodiment, the 4 bit multiplier operand MR[3:0], the 4 bit multiplicand operand MD[3:0] and the 4 bit polynomial value poly[3:0] each have four bits. The number of bits used in this example is for illustrative purposes. Other bit widths may be used as well, for example 32 bits. In addition, the multiplier operand and the multiplicand operand are not required to have the same number of bits.

In this embodiment, a register REG1 106 contains the 4 bit multiplicand operand MD[3:0] and a register REG2 108 contains the 4 bit multiplier operand MR[3:0]. In this example, during a first clock cycle, four partial products PP3[3:0], PP2[3:0], PP1[3:0], and PP0[3:0] are generated in the partial product generation block 110. The operation of the partial product generation block 110 operates will be explained in more detail later. During the first clock cycle, the partial products are reduced to a seven bit product MULT[6:0] by a logarithmic XOR reduction block 112 and stored in a 7 bit register REG3. The operation of the logarithmic XOR reduction block 112 operates will be explained in more detail later.

The multiplication datapath 102 includes REG1 106, REG2 108, the partial product generation block 110, the logarithmic XOR reduction block 112, and REG3 114. The multiplication datapath 102 operates on the multiplicand operand MD[3:0] and the multiplier operand MR[3:0] to produce the product MULT[6:0] during a single clock cycle in this example. In another embodiment, more than one clock cycle may be used in the multiplication datapath to produce the product MULT[6:0].

During a second clock cycle, REG3 114 provides the product MULT[6:0] to division blocks 118, 120 and 122. Also during the second clock cycle, REG4, provides polynomial value POLY[3:0] to division blocks 118, 120 and 122. In this embodiment, only three division blocks are used. However, the number of division blocks needed increases with the number of bits in the operands. The operation of the division blocks will be explained in more detail later. Together, the division blocks produce a 4 bit result, RESULT[3:0]. RESULT[3:0] represents the result of a Galois field multiplication with a 4 bit multiplicand operand MD[3:0], a 4 bit multiplier operand MR[3:0] and a polynomial value POLY[3:0].

The Galois field multiply as shown in FIG. 1 is completed in two clock cycles. The bit widths of the multiplicand operand, the multiplier operand and the polynomial value may increase beyond four bits while the number of clock cycles required to complete the Galois field multiply may not increase beyond two cycles. The bit widths of the multiplicand operand, the multiplier operand and the polynomial value that may be used are dependent on, for example, the delay through individual logic gates (i.e. AND gates and XOR gates) and the particular clock frequency f. The delay through individual logic gates is dependent on the process used to manufacture the logic gates.

An expression for the approximate delay through the partial generation block 110, the logarithmic XOR reduction block 112 and the individual division blocks will be described after describing the partial generation block 110, the logarithmic XOR reduction block 112 and the individual division blocks in more detail.

Figures 2, 2A:
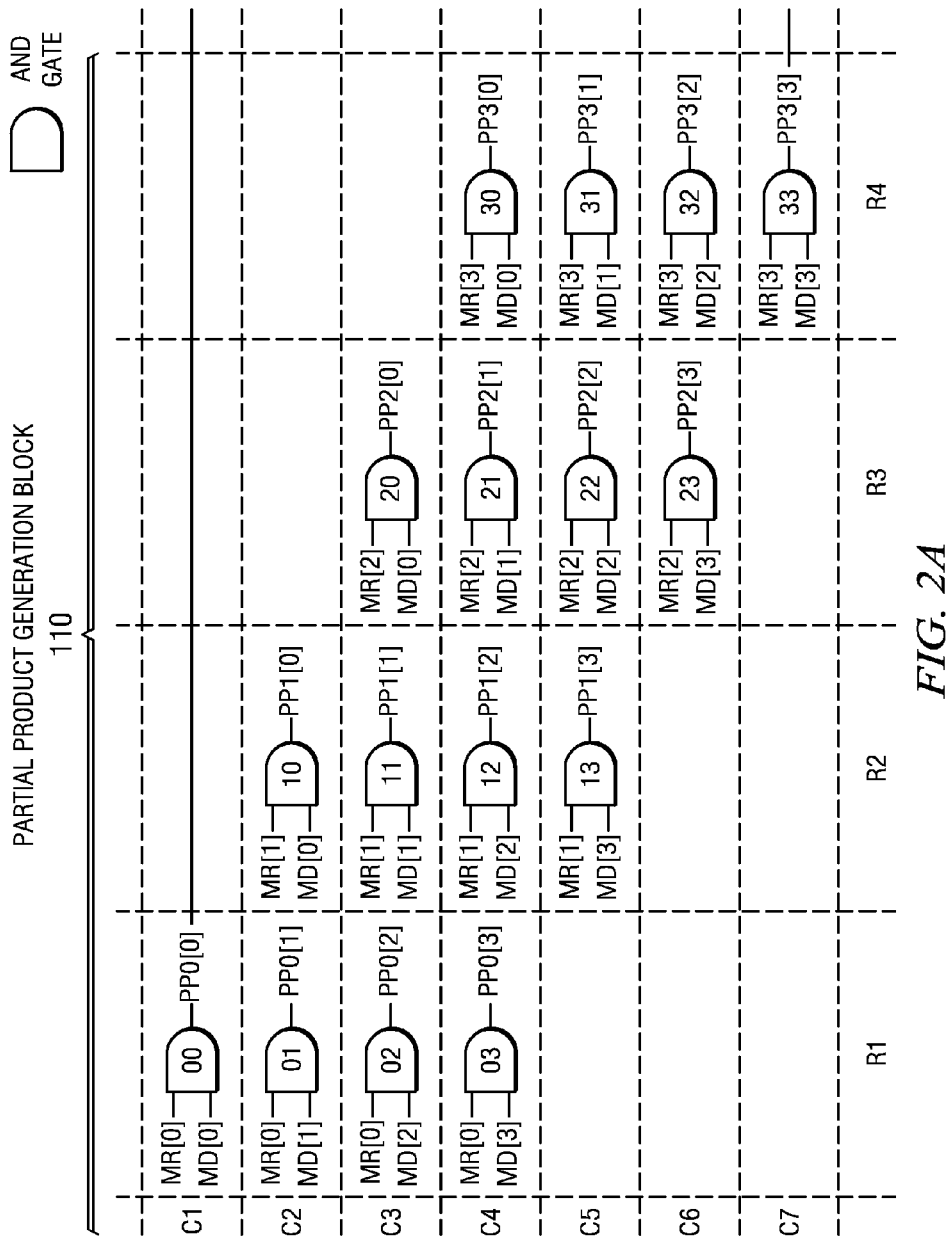
FIGS. 2, 2A and 2B are schematic drawings of an embodiment of a partial product generation block using two-input AND gates and an embodiment of a logarithmic XOR reduction block using two-input XOR gates.
Figure 2B:
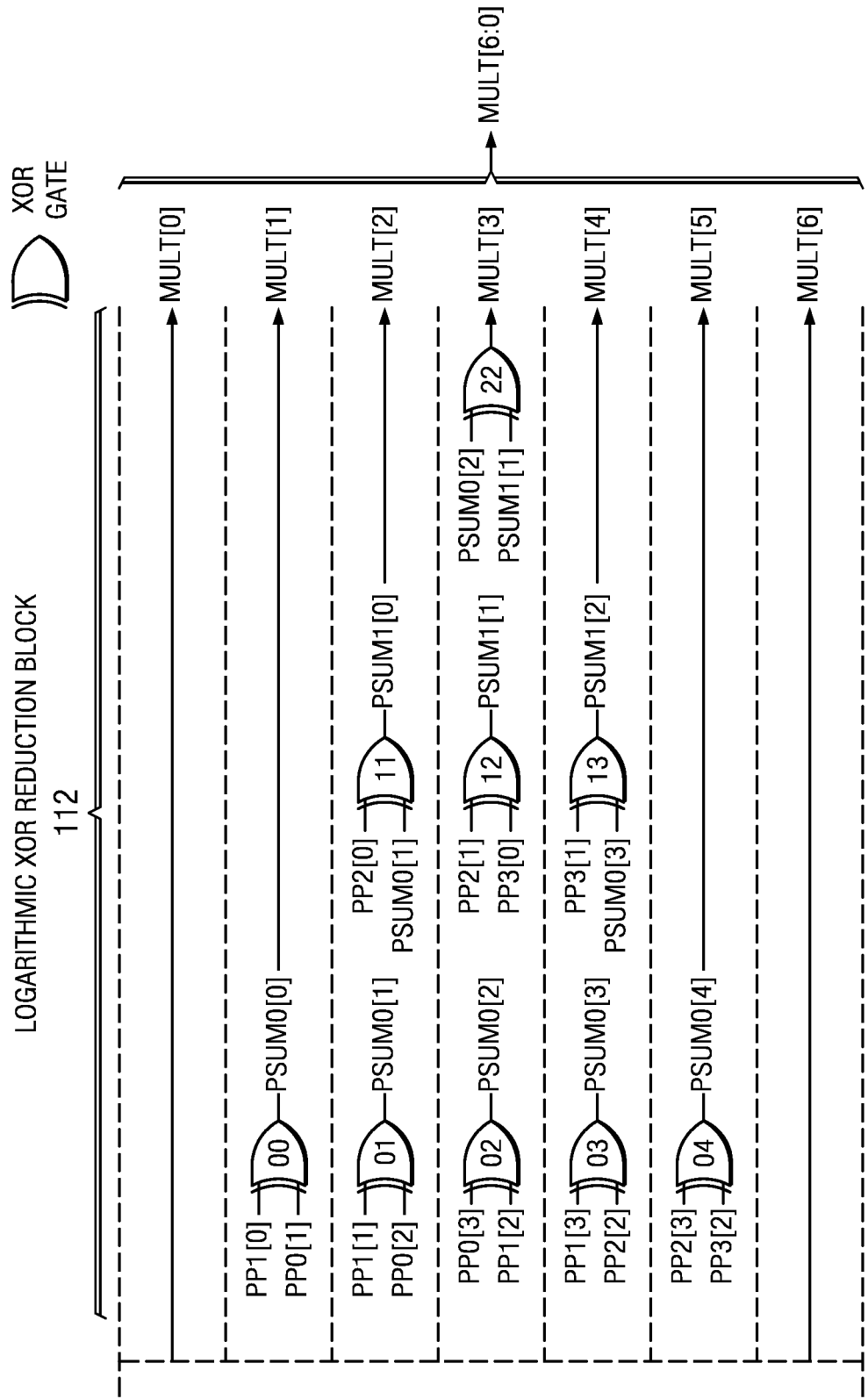

FIG. 2 is a schematic drawing of an embodiment of partial product generation block 110 and an embodiment a logarithmic XOR reduction block 112 using a 4 bit multiplier operand and a 4 bit multiplicand operand. Row R1 in the partial product generation circuitry 110 contains four two-input AND gates. Each bit of four bits of the multiplicand MD[3:0] is connected to an input of each AND gate in row R1 respectively. Bit 0 of the multiplier operand MR[3:0] is connected to the other input of each of the AND gates in row R1. The outputs of the AND gates in row R1 is one of four partial products. Row R2 contains four two-input AND gates. Each bit of four bits of the multiplicand MD[3:0] is connected to an input of each AND gate in row R2 respectively. Bit 1 of the multiplier operand MR[3:0] is connected to the other input of each of the AND gates in row R2. The outputs of the AND gates in row R2 are one of four partial products.

Row R3 in the partial product generation block 110 contains four two-input AND gates. Each bit of four bits of the multiplicand MD[3:0] is connected to an input of each AND gate in row R3 respectively. Bit 2 of the multiplier operand MR[3:0] is connected to the other input of each of the AND gates in row R3. The outputs of the AND gates in row R3 are one of four partial products. Row R4 contains four two-input AND gates. Each bit of four bits of the multiplicand MD[3:0] is connected to an input of each AND gate in row R4 respectively. Bit 3 of the multiplier operand MR[3:0] is connected to the other input of each of the AND gates in row R4. The outputs of the AND gates in row R4 are one of four partial products.

The outputs of the AND gates in the partial product generation block 110 produces PP3[3:0], PP2[3:0], PP1[3:0], and PP0[1:0]. The delay time of the partial product generation block 110 in this embodiment is only the delay of one two-input AND gate. When the number of bits increases in the multiplier operand and the multiplicand, the delay time of the partial product generation block 110 remains the delay time of one two-input AND gate.

In this embodiment, the logarithmic XOR reduction block 112 takes the outputs from the AND gates in a particular column and reduces those output to a single output using two-input XOR gates if necessary. For example, column C1 has only one output, so an XOR is not needed and the output PP0[0] of AND00 becomes bit MULT[0] of the product MULT[6:0]. In another example, column C4 has four outputs, one each from AND03, AND12, AND21, and AND30. Because there are four outputs, three two-input XOR gates are need to reduce the four outputs to one product output, MULT[3], of the product MULT[6:0]. In this example, partial product outputs PP1[2] and PP0[3] are inputs to XOR02 and partial product outputs PP3[0] and PP2[1] are inputs to XOR12. The outputs of XOR02 and XOR12 are inputs to XOR22 with the output of XOR22 being MULT[3].

In a further example, column C5 has three outputs, one each from AND13, AND22 and AND31. Because there are three outputs, two two-input XOR gates are need to reduce the three outputs to one product output, MULT[4], of the product MULT[6:0]. In this example, partial product outputs PP1[3] and PP2[2] are inputs to XOR03. Partial product output PP3[1] and the output of XOR03 are inputs to XOR13. The output of XOR13 is the product bit MULT[4] of the product MULT[6:0].

The longest delay path through the logarithmic XOR reduction block 112 is the delay through XOR02 or XOR12 and the delay through XOR22. The longest delay path through the logarithmic XOR reduction block 112 is approximately equal to $2*d_{2xor}$ wherein $d_{2XOR}$ is approximately equal to the delay through a two-input XOR gate. The longest delay path through logarithmic XOR reduction block 112 can be generalized in terms of the number of bits, n, in the multiplier operand and the multiplicand operand. An expression for the longest delay path through a logarithmic XOR reduction block is approximately equal to:

$$(\log_m n)*d_{mxor}$$

where m is an integer value representing the number of inputs to an XOR gate, n is the number of bits in the multiplicand operand, and $d_{mxor}$ represents the delay through an m-input XOR gate.

Figure 4A:
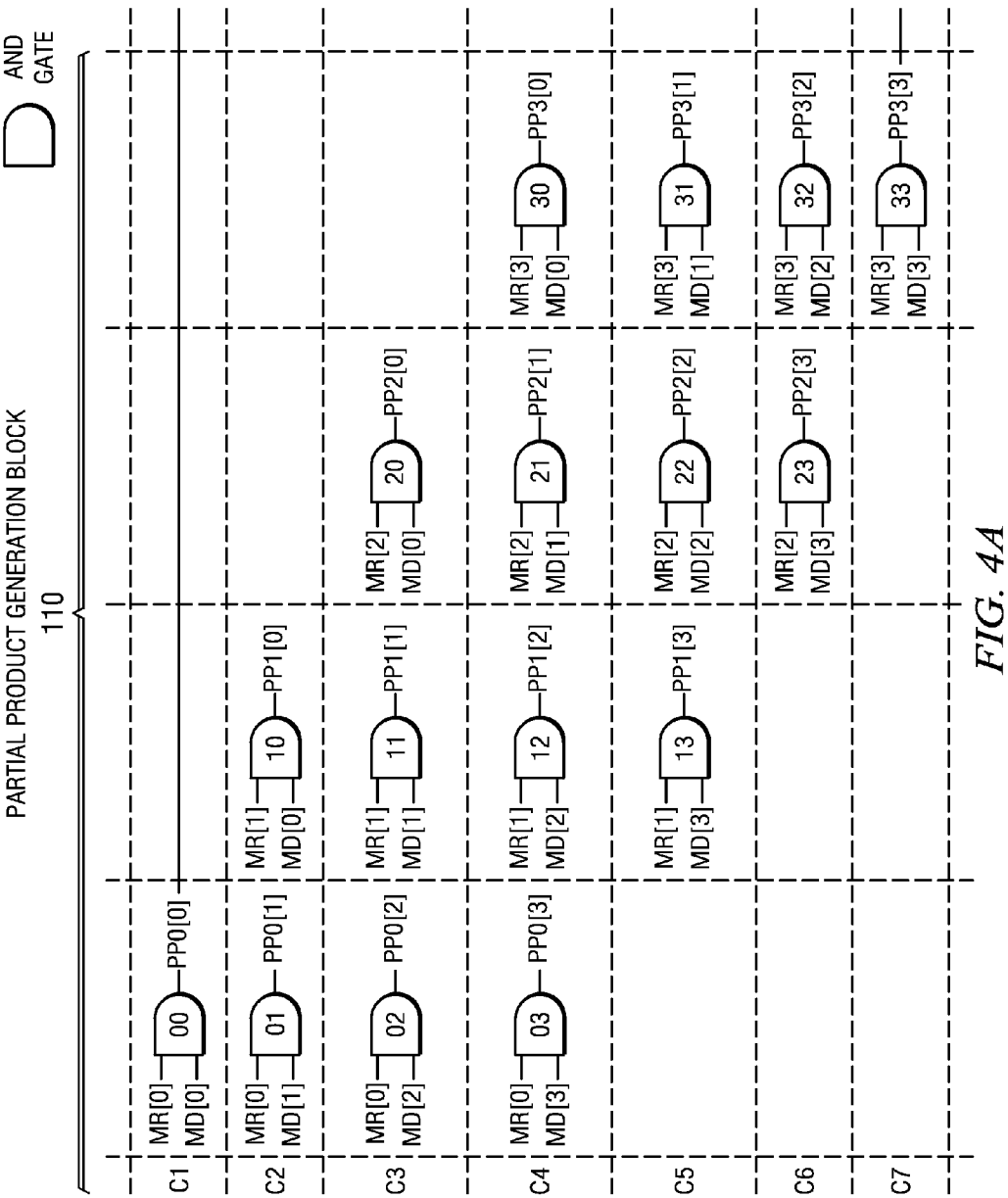
FIG. 4 is a schematic drawing of an embodiment of a partial product generation block using two-input AND gates and an embodiment of a logarithmic XOR reduction block using 3-input XOR gates and 2-input XOR gates.
Figure 4B:
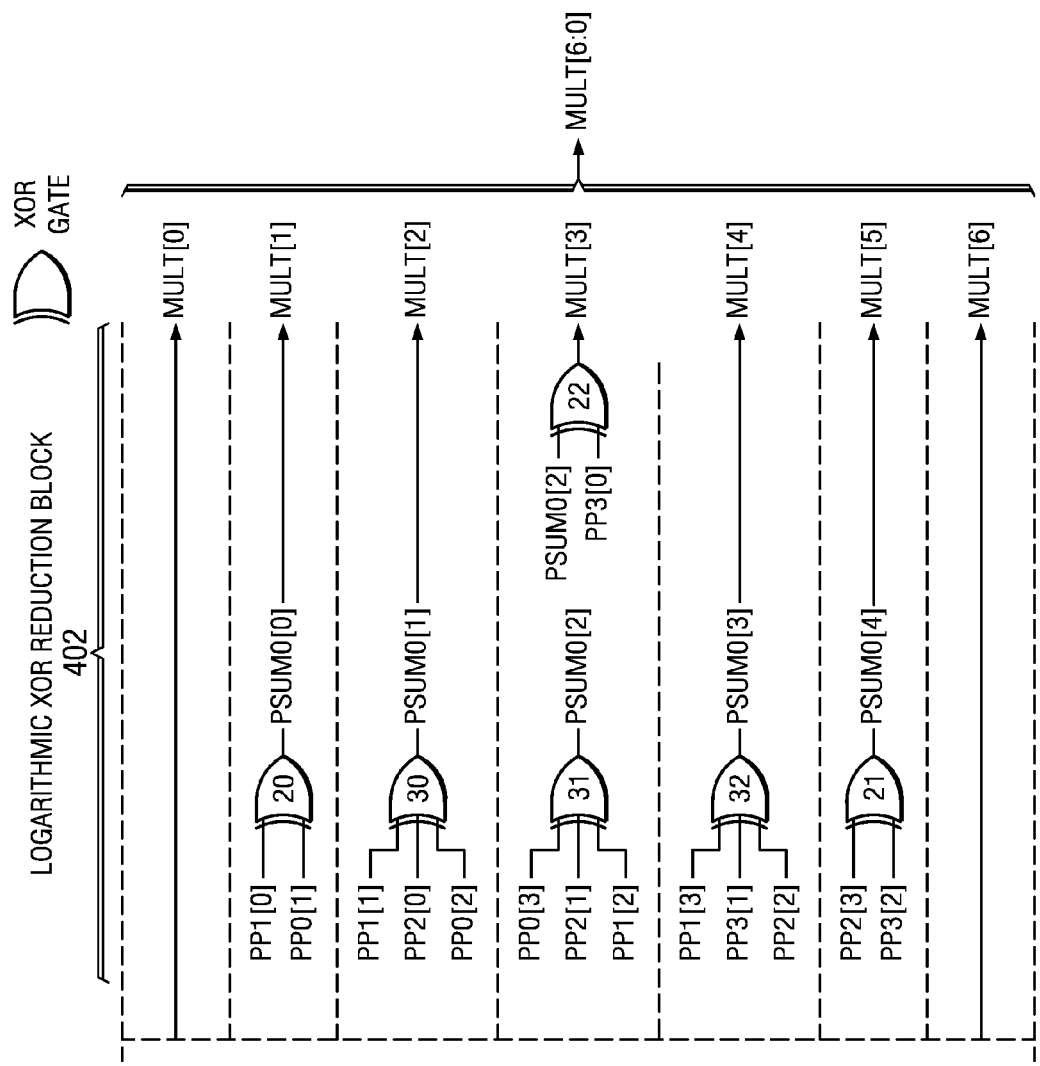

FIG. 4 is a schematic drawing of an embodiment of partial product generation block 110 using two-input AND gates and an embodiment of a logarithmic XOR reduction block 402 using three-input XOR gates and two-input XOR gates. A 4 bit multiplier operand and a 4 bit multiplicand operand are used in this embodiment. The partial products PP3[3:0], PP2[3:0], PP1[3:0], and PP0[3:0] are produced in the same manner as previously described in FIG. 2. However, the logarithmic XOR reduction of the partial products PP3[3:0], PP2[3:0], PP1[3:0], and PP0[3:0] is accomplished using three-input XOR gates and two-input XOR gates.

In this embodiment, the logarithmic XOR reduction block 402 takes the outputs from the AND gates in a particular column and reduces those output to a single output using three-input XOR gates or two-input XOR gates. For example, column C1 has only one output, so an XOR reduction is not needed and the output PP[0] of AND00 becomes bit MULT[0] of the product MULT[6:0]. In another example, column C3 has three outputs, one each from AND02, AND11 and AND20. Because there are three outputs, one three-input XOR gate is needed to reduce the three outputs to one product output, MULT[2], of the product MULT[6:0]. In this example, partial product outputs PP0[2], PP1[1] and PP2[0] are inputs to XOR30. The output of XOR30 becomes MULT [2], of the product MULT[6:0].

In a further example, column C6 has two outputs, one each from AND23 and AND32. Because there are two outputs, a two-input XOR is needed to reduce the two outputs to one product output, MULT[5], of the product MULT[6:0]. In this example, partial product outputs PP2[3] and PP3[2] are inputs to XOR21. The output PSUM0[4] of XOR21 is the product bit MULT[5] of the product MULT[6:0].

The longest delay path through the logarithmic XOR reduction block 402 is the delay through XOR31 and XOR22. The longest delay path through the logarithmic XOR reduction block 402 is approximately equal to $d_{3xor}+d_{2xor}$ wherein $d_{3XOR}$ is approximately equal to the delay through a three-input XOR gate and $d_{2XOR}$ is approximately equal to the delay through a two-input XOR. The delay through logarithmic XOR reduction block 112 can be generalized in terms of the number of bits, n, in the multiplier operand and the multiplicand operand. An expression for the delay through a logarithmic XOR reduction block is approximately equal to:

$$(\log_m n)*d_{mxor}$$

where m is an integer value representing the number of inputs to an XOR gate, n is the number of bits in the multiplicand operand, and $d_{mxor}$ represents the delay through an m-input XOR gate.

Figure 3:
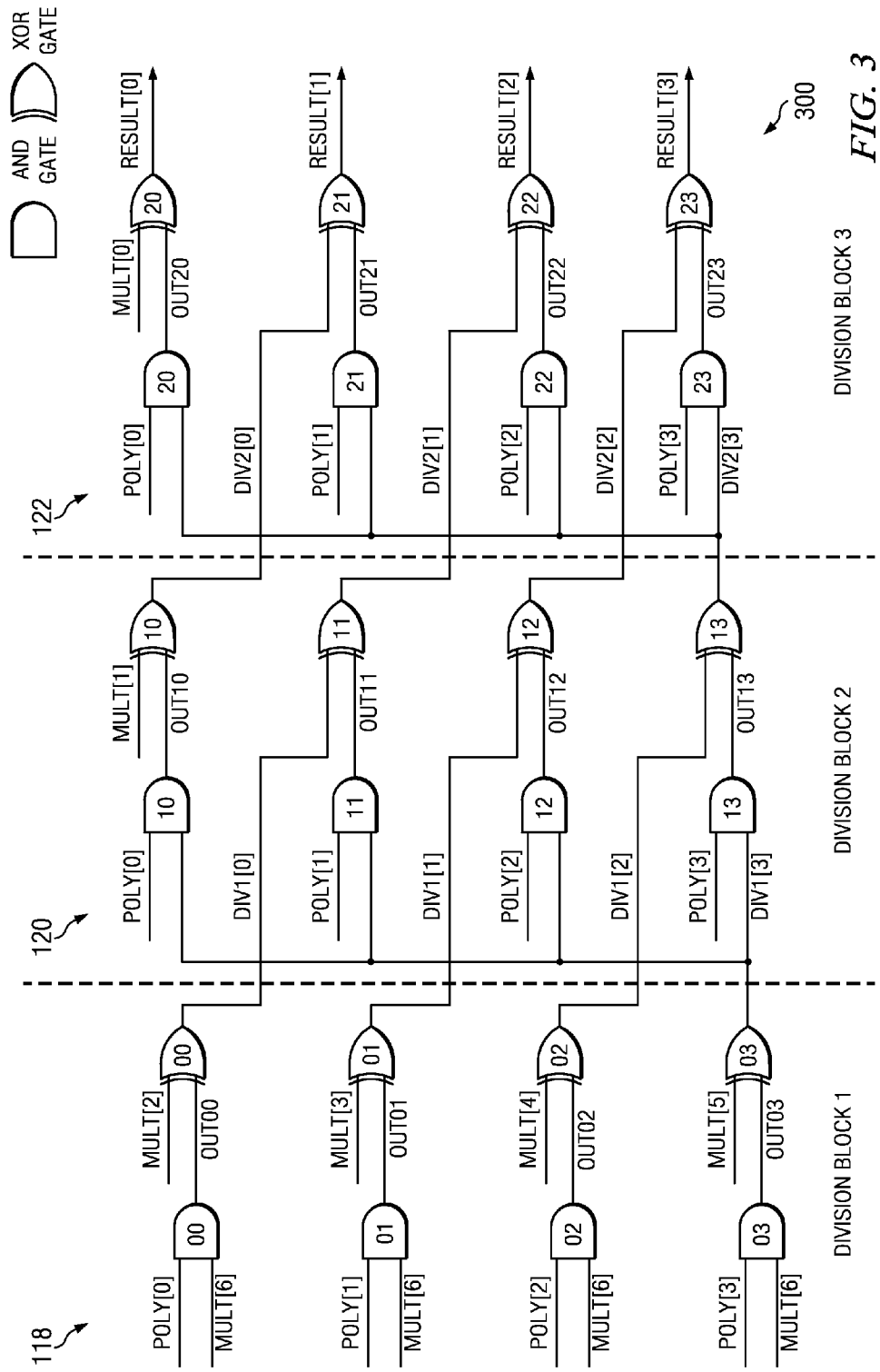
FIG. 3 is a schematic drawing of an embodiment of three division blocks used to divide a 7 bit product by a 4 bit polynomial value.

FIG. 3 is a schematic drawing of three division blocks used to divide a 7 bit product MULT[6:0] by a 4 bit polynomial value POLY[3:0]. Each divisional block 118, 120 and 122 has four two-input AND gates and four two-input XOR gates. Each of the 4 bits in the polynomial value POLY[3:0] is connected to an input of a two-input NAND gate in each divisional block 118, 120 and 122 respectively. In divisional block1 118, the other inputs to the two-input AND gates are connected to product bit MULT[6]. In divisional block2 120, the other inputs to the two-input AND gates are connected to the output DIV1[3] of XOR03. In divisional block3 122, the other inputs to the two-input AND gates are connected to the output DIV2[3] of XOR13.

The outputs, OUT03, OUT02, OUT01, and OUT00 are connected to an input of XOR03, XOR02, XOR01, and XOR00 respectively. The outputs, OUT13, OUT12, OUT11, and OUT10 are connected to an input of XOR13, XOR12, XOR11, and XOR10 respectively. The outputs, OUT23, OUT22, OUT21, and OUT20 are connected to an input of XOR23, XOR22, XOR21, and XOR20 respectively. Bits MULT[5:2] are connected to an input of XOR03, XOR02, XOR01, and XOR00 respectively. Bits DIV1[2:0] and MULT [1] are connected to an input of XOR13, XOR12, XOR11, and XOR10 respectively. Bits DIV2[2:0] and MULT[0] are connected to an input of XOR23, XOR22, XOR21, and XOR20 respectively. The outputs, RESULT[3:0] of XOR23, XOR22, XOR21, and XOR20 respectively contain the result of the Galois field multiplication.

In this example, the longest delay path through the 3 division blocks is the delay through three two-input AND gates and three two-input XOR gates. The number of division blocks j needed when using an n bit multiplicand operand, an n bit multiplier operand and an n bit polynomial value is (n−1). An expression for the delay through j division blocks is approximately equal to:

$$j*(d_{2AND}+d_{2xor})$$

where $d_{2AND}$ is the delay through a two-input AND gate and $d_{2xor}$ is the delay through a two-input XOR gate. As the width of the operands increases, the delay time through the division datapath also increases.

When the delay time through the multiplication datapath or the division datapath is too long to be completed in a given clock cycle, memory elements (e.g. registers) may be added as part of these paths to allow a Galois field multiplication to be done at a given clock frequency. This will be explained in more detail.

Figure 5:
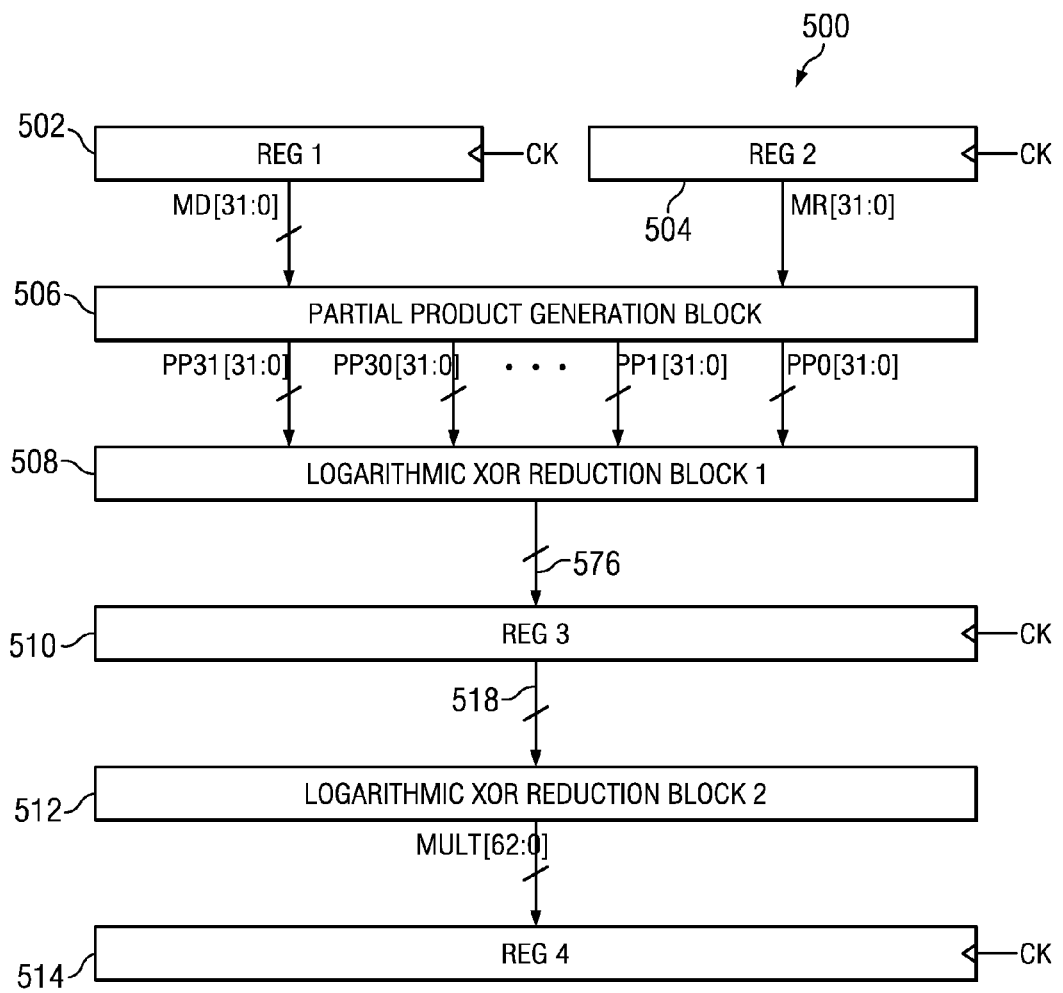
FIG. 5 is a block diagram of an embodiment of a multiplication datapath in a Galois field multiplier having a 32 bit multiplier operand and a 32 bit multiplicand operand.

FIG. 5 is a block diagram of an embodiment of a multiplication datapath 500 in Galois field multiplier having a 32 bit multiplier operand MR[31:0] and a 32 bit multiplicand operand MD[31:0]. In this embodiment, the 32 bit multiplicand operand MD[31:0] is stored in REG1 502 register and the 32 bit multiplier operand MR[31:0] is stored in REG2 504. At the beginning of a first clock cycle, the 32 bit multiplier operand MR[31:0] and a 32 bit multiplicand operand MD[31: 0] are applied to the input of the partial product generation block 506. In this example, the partial product generation block 506 uses 1,024 (32 rows with 32 two-input AND gates in each row) two-input AND gates. The delay time through the partial product generation block 506 remains the delay through one two-input AND gate. Having more bits in the operands does not change the delay time of the partial product generation block 506. In this case, there are more partial products calculated in parallel than the previous example.

32 partial products PP31[31:0]–PP0[31:0] with 32 bits in each partial product are produced by the partial product generation block 506 during the first clock cycle. These 32 partial products PP31[31:0]–PP0[31:0] are then applied to logarithmic XOR reduction block1 508. In this example, only part of the logarithmic XOR reduction is done by the logarithmic XOR reduction block1 508. The bits 576 needed to complete the logarithmic XOR reduction are stored in REG3 510 during the first clock cycle. At the beginning of a second clock cycle, the bits 576 needed to complete the logarithmic XOR reduction are presented to logarithmic XOR reduction block2 512. During the second clock cycle, the logarithmic XOR reduction block2 512 reduces bits 576 to a product MULT [62:0]. Product MULT[62:0] is then stored in register REG4 during the second clock cycle.

The longest delay through a single partial product generation block is approximately equal to:

$$(\log_m n)*d_{mxor}$$

where m is an integer value representing the number of inputs to an XOR gate, n is the number of bits in the operands, and $d_{mxor}$ represents the delay through an m-input XOR gate. In this embodiment, m=2 and n=32, so the longest delay through a single partial product generation block would be $(\log_2 32)$ $*d_{2xor}$ or $5*d_{2xor}$. In this example, because the delay through 5 2-input XOR gates is relatively short, a single partial product generation block may not need to be separated into two parts in order to operate at a certain clock frequency. However, this example has been explained to illustrate how a single partial product generation block may be divided into two separate partial product generation blocks if necessary.

Figure 6:
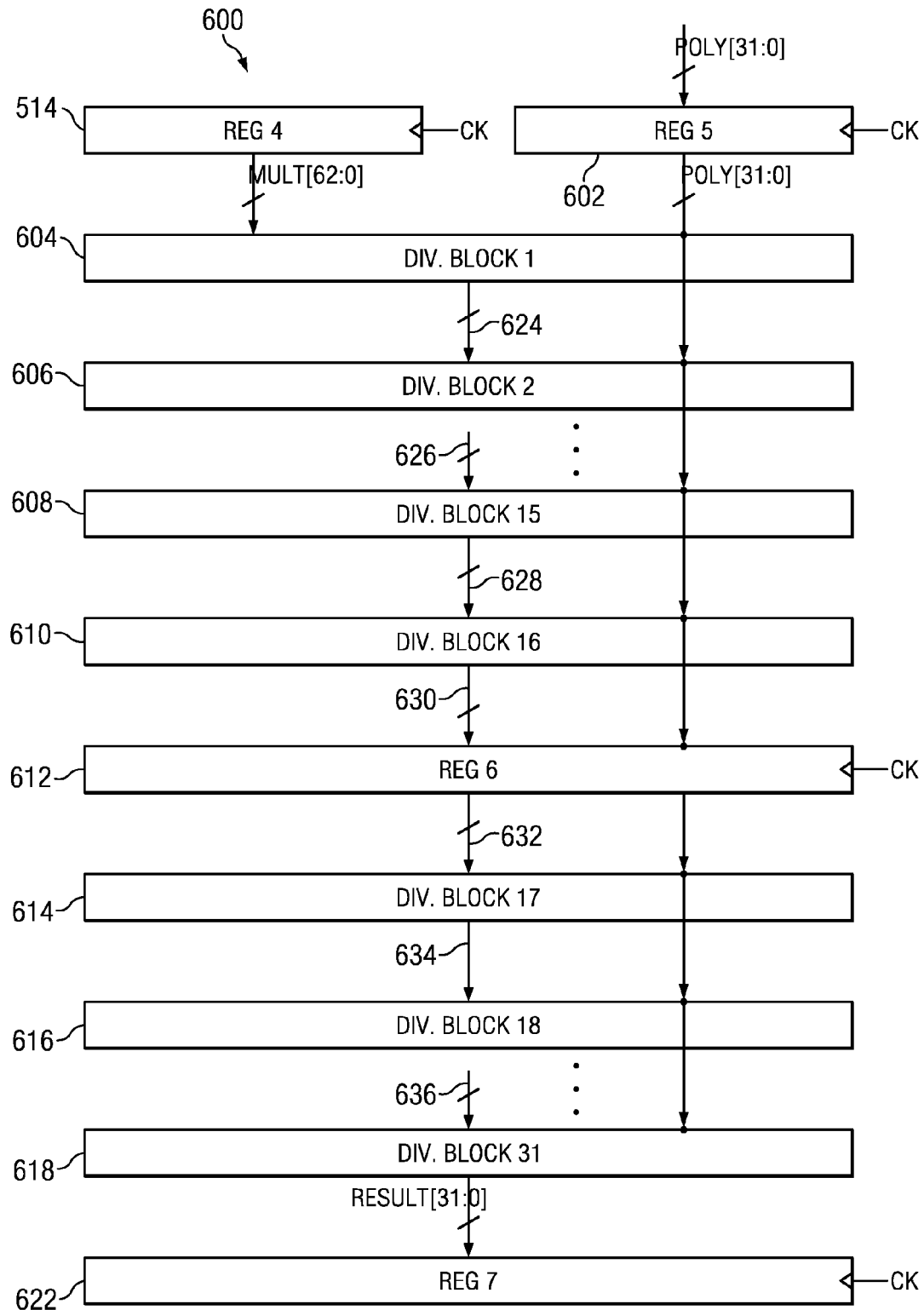
FIG. 6 is a block diagram of an embodiment of a division datapath in a Galois field multiplier having a 63 bit product, a 32 bit polynomial value and a 32 bit result.

FIG. 6 is a block diagram of an embodiment of a division datapath 600 in a Galois field multiplier having a 63 bit product, a 32 bit polynomial value and a 32 bit result. In this embodiment, the 63 bit product MULT[62:0] is stored in REG4 514 and a 32 polynomial value POLY[31:0] is stored in REG5 602. Each division block in division blocks DIV. BLOCK1-DIV. BIOCK31 contains 32 AND gates and 32 XOR gates and each division block is connected in the same manner as the division blocks 118, 120 and 122 shown in FIG.

3. Each division block shown in FIG. 6 has a longest delay of approximately $d_{2AND}+d_{2xor}$ wherein $d_{2AND}$ is the delay through a two-input AND gate and $d_{2xor}$ is the delay through a two-input XOR gate.

At the beginning of a first clock cycle, the 63 bit product MULT[62:0] and the 32 bit polynomial value POLY[31:0] are applied to the input of a division block1 604. The output 622 of division block1 604 is applied to the input of division block2 606. Division blocks 3-16 are connected in the same manner with the output of DIV. BLOCK16 610 connected to the input of register REG6 612. The output 628 of DIV. BLOCK 16 is stored in register REG6 612 during the first clock. The longest total delay through the first 16 division blocks is equal to $16*(d_{2AND}+d_{2xor})$.

After the first clock cycle and during a second clock cycle, register REG6 612 applies the result 630 of 16 division blocks to division block17. The output 634 of division block17 614 is applied to the input of division block18 616. Division blocks 19-31 are connected in the same manner with the output RESULT[31:0] of DIV. BLOCK 31 618 connected to the input of register REG7 622. The output RESULT[31:0] of DIV. BLOCK 31 618 is stored in register REG7 622 during the second clock cycle. The longest total delay through the second 15 division blocks is equal to $15*(d_{2AND}+d_{2xor})$. Depending on the delay of two-input XOR gates and two-input AND gates, the longest total delay through the second 15 division blocks may be shorter than the second clock cycle.

In the previous example, two clock cycles were required in order to produce the 32 bit result of dividing a 63 bit product by a 32 bit polynomial value. However, if the delay through 16 two-input AND gates and 16 two-input XOR gates was longer than a clock cycle, one or more registers may be added to shorten the longest delay path. Adding more registers, however, will increase the number of clock cycles required to produce the 32 bit result.

In the previous examples, the multiplier operand, the multiplicand operand and the polynomial value all had the same number of bits. In these examples, the delay through the partial product generation block 110 is the delay through a single AND gate. The delay through a single logarithmic XOR reduction block 112 is approximately:

$$(\log_m n)*d_{mxor}$$

where m is an integer value representing the number of inputs to an XOR gate, n is the number of bits in the multiplicand operand, and $d_{mxor}$ represents the delay through an m-input XOR gate. The delay through the division datapath 600 approximately equals $(n-1)*(d_{2AND}+d_{2xor})$ wherein $d_{2AND}$ is the delay through a two-input AND gate and $d_{2xor}$ is the delay through a two-input XOR gate.

In an other embodiment of the invention, the multiplier operand and the multiplicand operand are not required to have the same number of bits. For example, the multiplicand may have n bits and the multiplier may have k bits where n is greater than k. In this example, the polynomial value has n bits. The product produced by the multiplication datapath has (N+K−1) bits. In this embodiment, the delay through the partial product generation block is the delay through a single AND gate. The delay through a single logarithmic XOR reduction block is approximately:

$$(\log_n k)*d_{mxor}$$

where m is an integer value representing the number of inputs to an XOR gate, k is the number of bits in the multiplier operand, and $d_{mxor}$ represents the delay through an m-input XOR gate. The delay through a division datapath approximately equals $(k-1)*(d_{2AND}+d_{2xor})$ wherein $d_{2AND}$ is the delay through a two-input AND gate and $d_{2xor}$ is the delay through a two-input XOR gate.

In the above examples, AND gates and XOR gates were used to implement the logic required for a Galois field multiply. However, as is well known in the art, NAND gates may be used with XOR gates where the inputs to the XOR gates are inverted to implement a Galois field multiply. This is often called "shifting the bubble."

Figure 7:
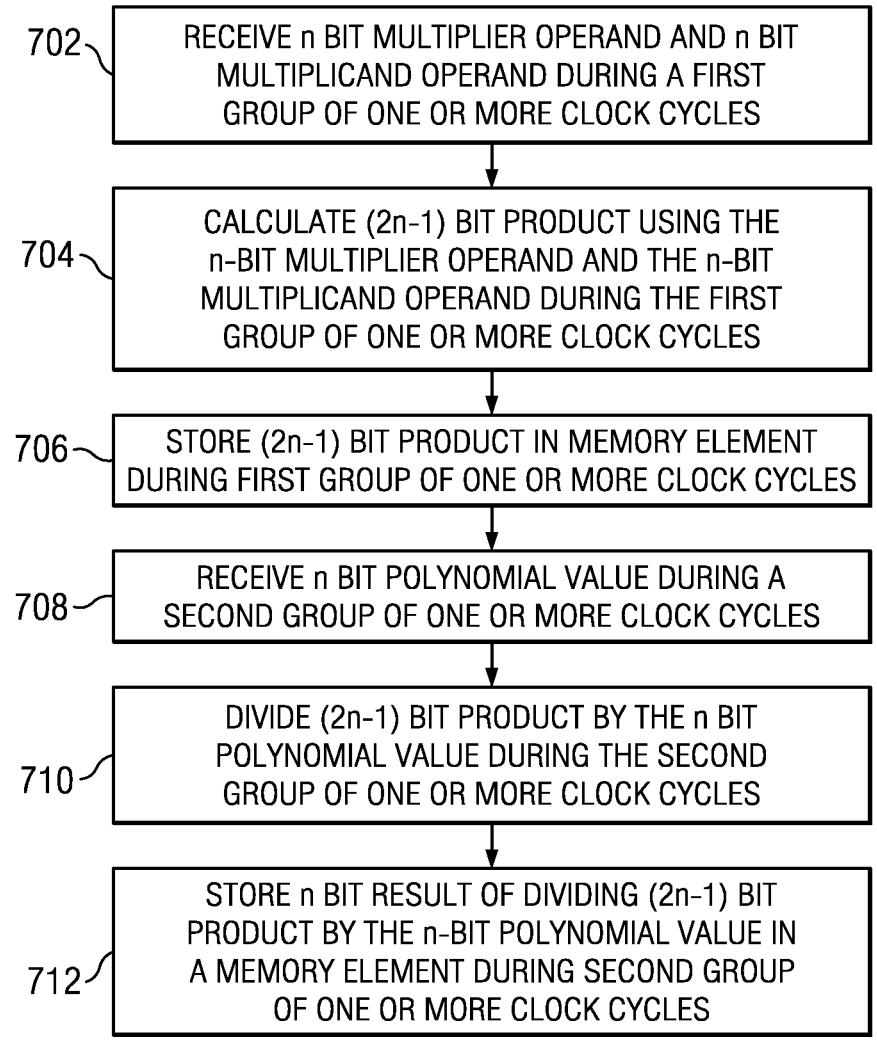
FIG. 7 is a flow chart illustrating an embodiment of a method of operating a Galois field multiplier unit in a processor.

In FIG. 7 is a flow chart illustrating an embodiment of a method of operating a Galois field multiplier unit in a processor. The method begins with a first step 702 where an n bit multiplier operand and n bit multiplicand operand are received during a first group of one or more clock cycles. Next, step 704 calculates a (2n−1) bit product using the n bit multiplier operand and the n bit multiplicand operand during the first group of one or more clock cycles. After calculating the (2n−1) bit product, step 706 stores the (2n−1) product in a memory element during the first group of one or more clock cycles.

During step 708 an n bit polynomial value is received during a second group of one or more clock cycles. The second group of one or more clock cycles follows the first group of one or more clock cycles. Next, in step 710, the (2n−1) bit product is divided by the n bit polynomial value during the second group of one or more clock cycles. During step 712, the n bit result of dividing the (2n−1) product by the n bit polynomial value is stored in a memory element during the second group of one or more clock cycles.

The foregoing description has been presented for purposes of illustration and description. It is not intended to be exhaustive or to limit the invention to the precise form disclosed, and other modifications and variations may be possible in light of the above teachings. The embodiments were chosen and described in order to best explain the applicable principles and their practical application to thereby enable others skilled in the art to best utilize various embodiments and various modifications as are suited to the particular use contemplated. It is intended that the appended claims be construed to include other alternative embodiments except insofar as limited by the prior art.

What is claimed is:

1. A method of operating a Galois field multiplier in a processor, the method comprising the steps of:
   receiving a k bit multiplier operand and an n bit multiplicand operand, during a first group of one or more clock cycles wherein n is greater than k;
   calculating a (n+k−1) bit product based on the k bit multiplier operand and the n bit multiplicand operand during the first group of one or more clock cycles;
   storing the (n+k−1) bit product in a first memory element during the first group of one or more clock cycles;
   receiving an n bit polynomial value during a second group of one or more clock cycles, the second group following in time after the first group;
   dividing the (n+k−1) bit product by the n bit polynomial value during the second group of one or more clock cycles;
   storing an n bit result of dividing the (n+k−1) product by the n bit polynomial value in a second memory element during the second group of one or more clock cycles.

2. The method of claim 1 wherein calculating the (n+k−1) bit product based on the k-bit multiplier operand and the n bit multiplicand operand during the first group of one or more clock cycles comprises:
   producing n bit partial products; and
   reducing the n bit partial products to the (n+k−1) product using a logarithmic XOR reduction.

3. The method of claim 2 wherein producing n bit partial products comprises:
  ANDing the k-bit multiplier operand and the n bit multiplicand operand.

4. The method of claim 1 wherein dividing the (n+k−1) bit product by the n bit polynomial value comprises:
  performing n−1 division steps, the first division step comprising:
    ANDing the most significant bit (MSB) of the (n+k−1) product with the n bit polynomial value generating an n bit first intermediate output; and
    XORing the n bit first intermediate output with the n bits of the product that immediately follow the MSB of the product generating an output;
  wherein each of the n−1 division steps following the first division step comprise:
    ANDing a most significant bit (MSB) of the output of the previous step with the n bit polynomial value generating an n bit second intermediate output;
    XORing the n bit second intermediate output with the n−1 least significant (LSB) bits from the output of the previous step and a bit from the (n+k−1) product.

5. The method of claim 4 wherein each of the n−1 division steps may be performed in one or more clock cycles.

6. A Galois field multiplier comprising:
  a first plurality of AND gates for generating partial products from a k bit multiplier and an n bit multiplicand during a first group of one or more clock cycles wherein n is greater than k;
  a first plurality of XOR gates for logarithmically reducing the partial products to a (n+k−1) product during the first group of one or more clock cycles;
  a first memory element for storing the (n+k−1) product during the first group of one or more clock cycles;
  a second plurality of AND gates and a second plurality XOR gates for dividing the (n+k−1) product by an n bit polynomial value during a second group of one or more clock cycles, the second group following in time after the first group;
  storing an n bit result of dividing the (n+k−1) product by the n bit polynomial value in a second memory element during the second group of one or more clock cycles.

7. The Galois field multiplier of claim 6 wherein the first plurality of AND gates are two-input AND gates, the first plurality of XOR gates are two-input XOR gates, the second plurality of AND gates are two-input AND gates, and the second plurality of two-input XOR gates.

8. The Galois field multiplier of claim 7 wherein a longest delay path through the first plurality of XOR gates is approximately equal to:

$$(\log_2 n)*d_{2XOR};$$

wherein $d_{2XOR}$ is approximately equal to the delay through a two-input XOR gate.

9. The Galois field multiplier of claim 7 wherein a longest delay path through the second plurality of XOR gates and the second plurality of AND gates is approximately equal to:

$$(n-1)*(d_{2XOR}+d_{2AND});$$

wherein $d_{2XOR}$ is approximately equal to a delay through a two-input XOR gate;
wherein $d_{2AND}$ is approximately equal to a delay through a two-input AND gate.

10. The Galois field multiplier of claim 6 wherein the first plurality of AND gates are two-input AND gates, the first plurality of XOR gates are three-input XOR gates, the second plurality of AND gates are two-input AND gates, and the second plurality of two-input XOR gates.

11. The Galois field multiplier of claim 10 wherein a longest delay path through the first plurality of XOR gates is approximately equal to:

$$(\log_3 n)*d_{3XOR}$$

wherein $d_{3XOR}$ is approximately equal to the delay through a three-input XOR gate.

12. The Galois field multiplier of claim 6 wherein the generated partial products from the k bit multiplier and the n bit multiplicand are generated in a first clock cycle from the first group of one or more clock cycles;
  wherein the generated partial products are logarithmically reduced to a (n+k−1) product in a second clock cycle from the first group of one or more clock cycles.

* * * * *